T. J. ELLISON.
CORN PLANTER.
APPLICATION FILED SEPT. 17, 1918.

1,298,483.

Patented Mar. 25, 1919.
2 SHEETS—SHEET 1.

Inventor
THOMAS J. ELLISON
By
Attorneys

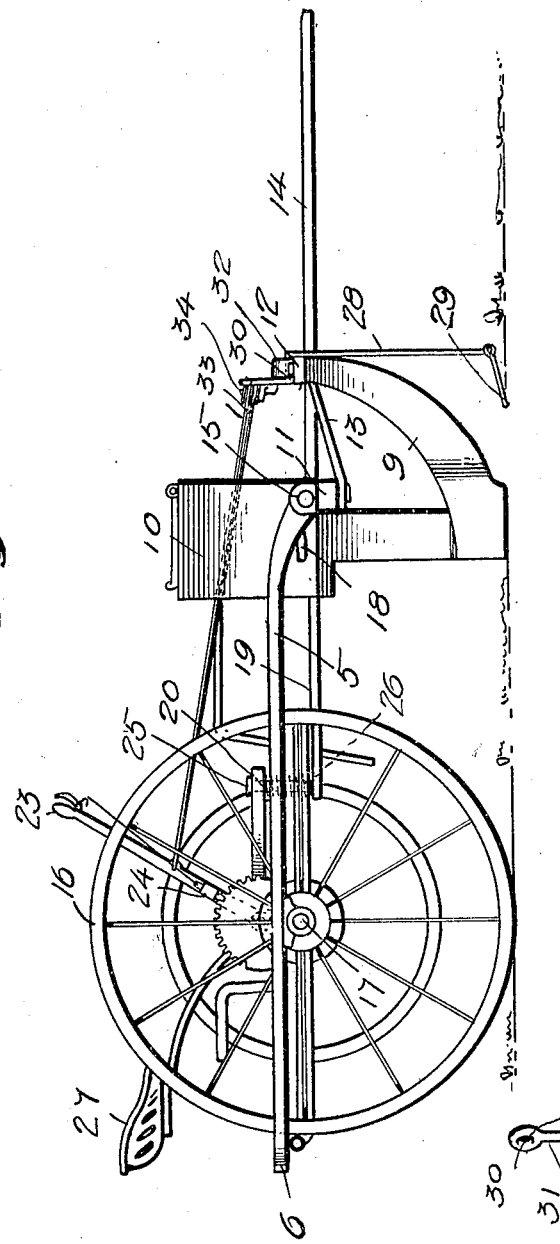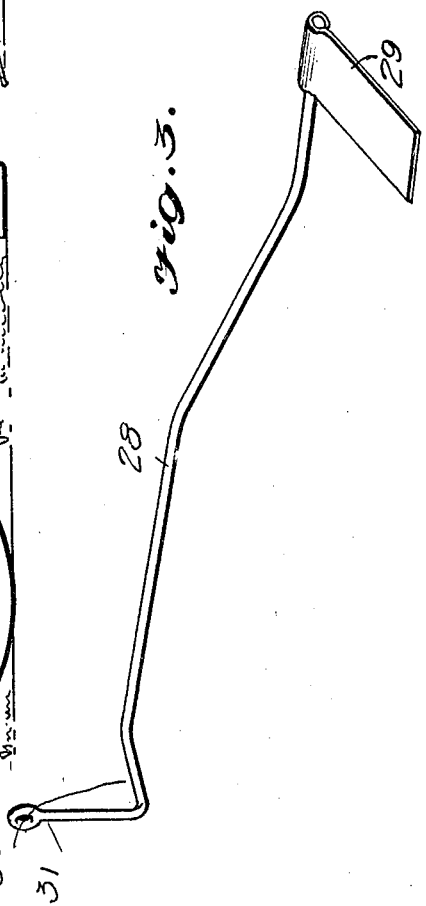

UNITED STATES PATENT OFFICE.

THOMAS J. ELLISON, OF TERRILL, KENTUCKY.

CORN-PLANTER.

1,298,483. Specification of Letters Patent. Patented Mar. 25, 1919.

Application filed September 17, 1918. Serial No. 254,388.

*To all whom it may concern:*

Be it known that I, THOMAS J. ELLISON, a citizen of the United States, residing at Terrill, in the county of Madison and State of Kentucky, have invented new and useful Improvements in Corn-Planters, of which the following is a specification.

This invention relates to corn-planters, and more particularly to the means whereby the driver is enabled to guide the machine to keep the rows parallel and the proper distance apart.

The invention has for its object to provide a guide device which trails along the ground in the line of a previously planted row, and which is automatically elevated when the machine makes a turn at the end of the row. The invention is applicable to a corn-planter having a pivotally supported runner frame which is elevated when a turn is to be made, and the means whereby the runner frame is elevated is provided with a connection with the guide device, whereby the latter is raised or lowered with said frame.

With the object stated in view, the invention consists in a novel combination and arrangement of parts to be hereinafter described and claimed, and in order that the same may be better understood, reference is had to the accompanying drawings forming a part of this specification.

In the drawings,

Fig. 2 is a side elevation thereof, and

Fig. 3 is a perspective view of the guide device.

Figure 1:
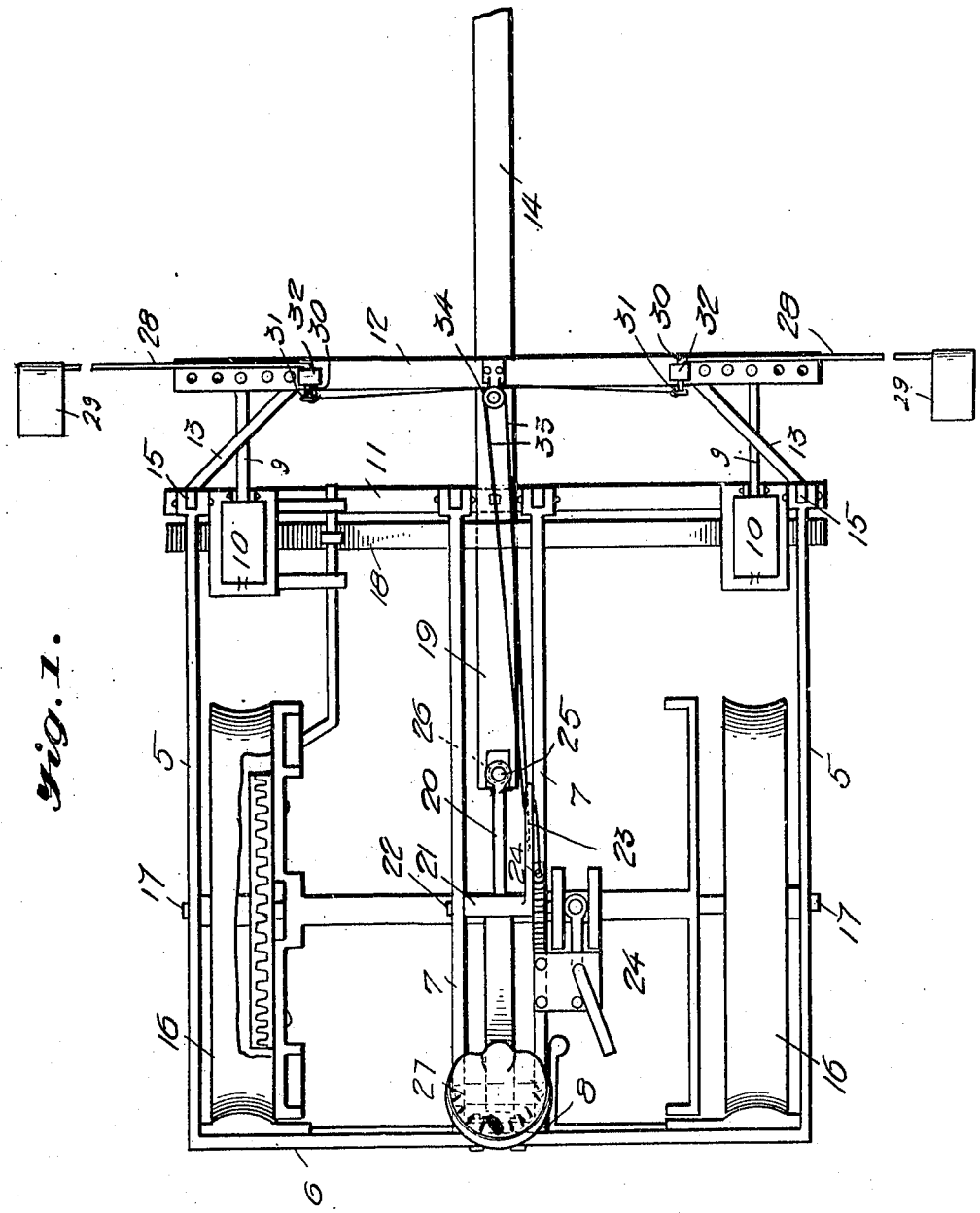
Figure 1 is a plan view of the invention.

Referring specifically to the drawings, the main frame of the machine has outer side bars 5 connected by a rear end cross bar 6. The main frame also includes an inside frame composed of laterally spaced, and parallel longitudinal bars 7 having a rear cross bar 8 which is bolted or otherwise secured to the cross bar 6.

The runner frame is positioned in front of the main frame, and carries the furrow opening runners or shoes 9 and the seed boxes 10. This frame is composed of two cross bars 11 and 12, respectively, connected by braces 13, and carrying the usual draft tongue 14. The cross bar 11 is pivotally connected to the front ends of the main frame bars 5 and 7, as indicated at 15.

The carrying wheels 16 are on an axle 17 which supports the main frame. The dropping mechanism is a slide 18 operated as described in my Patent No. 1233208 dated July 10, 1917.

For raising and lowering the runner frame, the tongue 14 is provided with a rearward extension 19 having a yielding connection with a lever arm 20 extending forwardly from a sleeve 21 journaled on a shaft 22 extending between and supported by the frame bars 7. To the sleeve is also fixed a hand lever 23 provided with the customary locking means 24. Thus, when the lever 23 is pulled back the runner frame is elevated, and when swung forward, said frame is lowered to operative position. The connection between the parts 19 and 20 is a bolt 25 around which is coiled a spring 26 which gives relief to the runners or shoes 9 when passing over rocks, roots or other obstructions.

The main frame of the machine carries a seat 27 for the driver.

The device for assisting the driver to guide the machine comprises two staffs 28 carried by the front bar 12 of the runner frame and extending from opposite sides thereof, and having loosely mounted on their outer ends light plates 29 which are designed to trail along the ground, the plates being pivoted so that they can freely pass over uneven ground. The staffs 28 carrying the guide plates are so held that their weight is not borne by the ground, and only the weight of the plates is borne by the ground, and as they are light and pivotally supported, they offer no resistance to the forward travel of the machine, and there is no side draft.

The inner end of each staff 28 has a crank-arm 30 from which a rocker arm 31 extends, and on the bar 12 is a bearing 32 in which the crank-arm is journaled. It will therefore be seen that by attaching a suitable actuating device to the rocker-arm, the staff may be elevated to raise its guide plate off the ground, and in order that this may be done automatically when the runner frame is elevated preparatory to making a turn, I provide a connection between the hand lever 23 and the rocker arms 31. This connection comprises two ropes or other flexible members 33 connected respectively to the rocker arms and to the hand lever. On the frame bar 12 is a guide pulley 34 for the ropes. It will be evident from the foregoing that when the hand lever 23 is pulled back to elevate the runner frame, the staffs swing 28 upward to take the guide plates off the ground, and when the lever is swung forward to lower the runner frame, the line 33 is paid out to allow the staff to drop down and restore the guide plates to operative position.

I claim:

In a corn-planter, a main frame, a runner frame in front thereof, a lever carried by the main frame and having a connection with the runner frame for raising and lowering the same, a pair of guide staffs extending from opposite sides of the runner frame, crank arms on the inner ends of the staffs, bearings on the runner frame in which the crank-arms are journaled, rocker-arms extending from the crank-arms, and flexible connections between the rocker-arms and the aforesaid lever.

In testimony whereof I affix my signature.

THOMAS J. ELLISON.

Copies of this patent may be obtained for five cents each, by addressing the "Commissioner of Patents, Washington, D. C."